US005617413A

United States Patent [19]
Monacos

[11] Patent Number: 5,617,413
[45] Date of Patent: Apr. 1, 1997

[54] SCALABLE WRAP-AROUND SHUFFLE EXCHANGE NETWORK WITH DEFLECTION ROUTING

[75] Inventor: Steve P. Monacos, Altadena, Calif.

[73] Assignee: The United States of America as represented by the Administrator of the National Aeronautics and Space Administration, Washington, D.C.

[21] Appl. No.: 378,994

[22] Filed: Jan. 27, 1995

Related U.S. Application Data

[63] Continuation of Ser. No. 112,497, Aug. 18, 1993, abandoned.

[51] Int. Cl.$^6$ .................................................. H04L 12/58
[52] U.S. Cl. .................................................. 370/400; 370/427
[58] Field of Search .................................. 359/117, 128, 359/147; 370/60, 60.1, 94.1, 16, 58.2, 58.3, 17, 14, 15, 13, 54, 16.1, 58.1; 379/221, 220, 219; 340/827, 826, 825.03; 375/260

[56] References Cited

U.S. PATENT DOCUMENTS

| | | | |
|---|---|---|---|
| 4,893,304 | 1/1990 | Giacopelli et al. | 370/60 |
| 5,010,550 | 4/1991 | Hirata | 370/16 |
| 5,014,266 | 5/1991 | Bales et al. | 370/60 |
| 5,103,220 | 4/1992 | Brünle | 370/16 |
| 5,218,465 | 6/1993 | Lebby et al. | 370/16 |
| 5,229,990 | 7/1993 | Teraslinna | 370/16 |
| 5,325,090 | 6/1994 | Goeldner | 370/54 |
| 5,341,234 | 8/1994 | Suzuki et al. | 359/117 |
| 5,416,769 | 5/1995 | Karol | 370/60 |

Primary Examiner—Wellington Chin
Assistant Examiner—Huy D. Vu
Attorney, Agent, or Firm—John H. Kusmiss

[57] ABSTRACT

The invention in one embodiment is a communication network including plural non-blocking crossbar nodes, first apparatus for connecting the nodes in a first layer of connecting links, and second apparatus for connecting the nodes in a second layer of connecting links independent of the first layer, whereby each layer is connected to the other layer at each one of the nodes. Preferably, each one of the layers of connecting links corresponds to one recirculating network topology that closes in on itself.

62 Claims, 10 Drawing Sheets

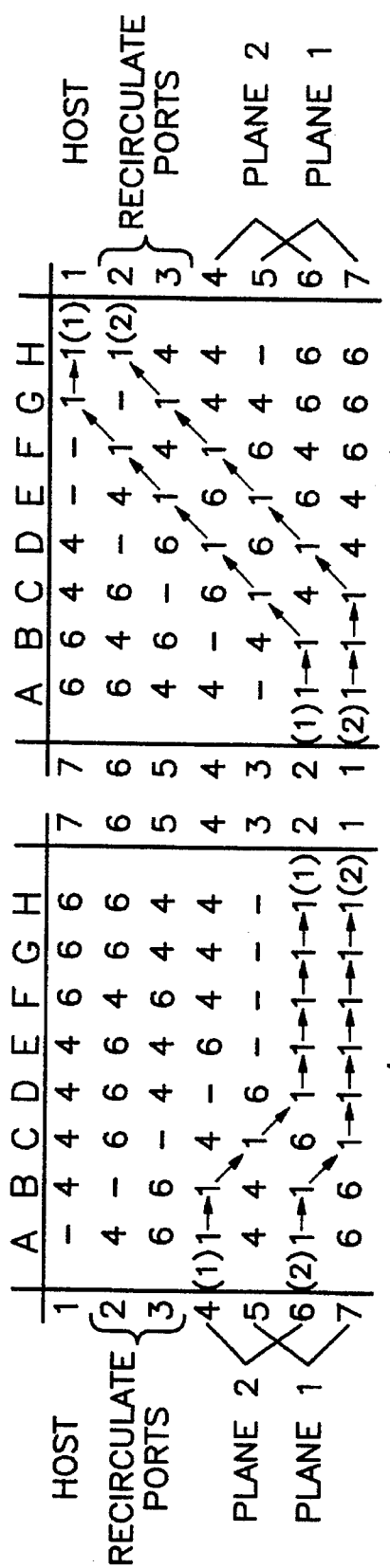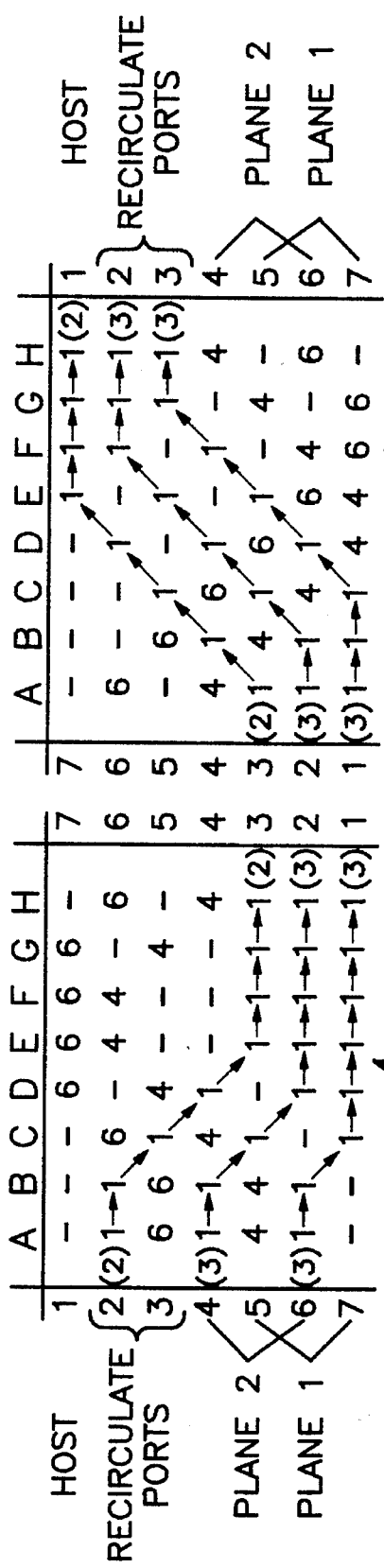
FIG. 8A
FIG. 8B

SCALABLE WRAP-AROUND SHUFFLE EXCHANGE NETWORK WITH DEFLECTION ROUTING

ORIGIN OF THE INVENTION

The invention described herein was made in the performance of work under a NASA contract, and is subject to the provisions of Public Law 96-517 (35 USC 202) in which the Contractor has elected not to retain title.

This application is a continuation of application Ser. No. 08/112,497 filed Aug. 18, 1993, now abandoned.

BACKGROUND OF THE INVENTION

1. Technical Field

The invention relates to a high-speed optical wide area network (WAN) employing recirculating network topologies such as a shuffle exchange network (SN).

2. Background Art

Many networks discussed in the literature aim to optimize network characteristics at the expense of complicating the implementation. While such networks provide good performance bench marks, they are often difficult to implement with current or near-future technology. Current optical communication networks typically operate at a single frequency in a ring or bus topology. One example is the fiber distributed data interface (FDDI), which is a 100 megabit/sec token ring network. As computational and communications demands increase, such networks are inadequate to handle future demand.

One way to attempt alleviating such inadequacies could be to scale the size of the network, which corresponds to the number of bidirectional host I/O links to the network. FIG. 1 shows an 8-node SN with four of eight I/O links being used. One possible approach to increasing the network capacity with respect to the I/O capacity is to increase the number of SN switching nodes while keeping the number of host connections fixed. In the case of FIG. 1, only half of the I/O capacity of the network is used resulting in a doubling of the network capacity compared to the I/O bandwidth. While this approach does alleviate congestion problems, it does not apply the SN topology in an optimal way. The SN topology provides the minimum hop path for a given number of nodes. The penalty paid for this characteristic is that a deflected packet will incur an additional k hops in reaching its destination, where k is the number of switching node columns. Scaling the network in this way only helps if packet deflection is avoided. If network "hot spots" exist and result in packet deflections, the end result is to increase the latency of deflected packets due to the addition of more node stages when scaling the network in this way. In fact, for such cyclic SN networks, unacceptable delays can be encountered when as little as 15% of the inputs are in simultaneous use, depending upon desired packet destinations. For a cyclic SN, the number of switching nodes is $k*2^k$, for k switching node stages with $2^k$ nodes per stage. For FIG. 1, k is equal to two.

SUMMARY OF THE DISCLOSURE

The invention in one embodiment is a communication network including plural crossbar nodes, first apparatus for connecting the nodes in a first layer of connecting links, and second apparatus for connecting the nodes in a second layer of connecting links independent of the first layer, whereby each layer is connected to the other layer at each one of the nodes. Preferably, each one of the layers of connecting links corresponds to one recirculating network topology that closes in on itself. Thus, the network topology is preferably one of: (a) a shuffle exchange network, (b) a hypercube network or (c) a manhattan street network. The network may further include third apparatus for connecting the nodes in a third layer of connecting links independent of the first and second layers, and fourth apparatus for connecting the nodes in a fourth layer of connecting links independent of the first, second and third layers, whereby each layer is connected to every other layer at each one of the nodes. In the preferred embodiment, the network topology of each of the layers is that of a cyclic shuffle exchange network and wherein the first and second layers include first and second rings of the connecting links. The communication network can include plural hosts connected to respective ones of the nodes. One embodiment is disclosed in which the network topology of each of the layers is that of a cyclic shuffle exchange network and wherein the first, second, third and fourth layers include four respective rings of the connecting links.

Preferably, each of the nodes include deflection routing apparatus for routing a packet destined for travel in one of the layers to the other layer whenever access of the packet to the one layer is blocked. Each packet has a destination node and the deflection routing apparatus routes the packet on a particular link of the second layer to the destination node, such that a packet is routed directly to its destination node whether or not it is deflected from a given layer. Each one of the nodes includes N output ports connected to respective ones of the links of the layers, wherein adjacent ones of the output ports are connected to the links of different layers, and apparatus for routing a packet in the node destined for one of the output ports to the adjacent output port whenever the one output port is blocked.

In one embodiment, each link is capable of carrying a data packet between nodes and each data packet has a header identifying one of the nodes as the destination of the packet, and each of the nodes includes an address translation table which specifies for a given destination node an output port corresponding to an optimum route to the destination node.

Preferably, each of the nodes is a non-blocking crossbar switch of N input ports and includes a pair of permutation engines in cascade. Each of the permutation engines includes a plurality of individual links which carry individual packets, each link having a link input end and a link output end, a plurality of switches, each of the switches having at least top and bottom switch inputs connected to a corresponding pair of the link output ends and top and bottom switch outputs connected to a corresponding pair of link input ends. Thus, each switch is connected to four different links. Each of the switches has an exchange state which routes packets from the top and bottom switch inputs to the bottom and top switch outputs, respectively, and a bypass state which routes packets from the top and bottom switch inputs to the top and bottom switch outputs, respectively. Furthermore, a plurality of individual controller apparatuses govern respective ones of the switches by sensing from a header of a packet at each switch input the identity of the destination output port of the packet and selecting one of the exchange and bypass states in accordance with the identity of the destination output port and in accordance with the location of the corresponding switch relative to the destination output port.

Each node further includes N input ports, and the network includes a host at one of the nodes, and one of the input ports and one of the output ports of the one node are connected to the host, and at least one pair, each, of the input ports and of the output ports is connected to another one of the nodes, each port in each pair being connected to links in different ones of the layers.

In accordance with one feature of the invention, at least one of the input ports and one of the output ports of the one node are connected directly together in a recirculating queue. With this feature, the one node includes apparatus for routing a packet deflected from its destination output port to an adjacent output port and wherein the input and output ports of the recirculating queue are adjacent the input and output ports connected to the host, whereby to provide a recirculating queue for packets deflected from the host.

BRIEF DESCRIPTION OF THE DRAWINGS

FIG. 8A is a diagram illustrating one example of the operation of the 7-input permutation engine pair of FIG. 4 in routing six packets, two of which contend for the same output port.

FIG. 8B is a diagram illustrating another example of the operation of the 7-input permutation engine of FIG. 4 in routing five packets, three of which contend for the same output port.

DETAILED DESCRIPTION OF THE PREFERRED EMBODIMENTS

Introduction:

In order to meet the ever-increasing bandwidth requirements, the invention includes multiple layers of a recirculating network topology, the topology of each layer being a replica of the conventional topology, the number of nodes corresponding to that of a single layer, each node spanning all layers. In the preferred embodiment, each layer is a cyclic shuffle exchange network (SN) constituting a ring or cylindrical surface so that the network is a multiple-ring cyclic shuffle exchange network (SN) that is implemented using off-the-shelf hardware while providing good performance characteristics through scalability of the network. The invention keeps the control mechanisms simple by enabling scalability in every aspect of the network architecture.

In the preferred embodiment, data is transmitted optically in a wavelength division multiplexed (WDM) format, deflection routing is used to direct traffic through the multi-ring cyclic shuffle exchange network (SN), N×N permutation engine switching nodes are used to perform the routing and arbitration functions of the SN, and traffic can be packet synchronous or asynchronous.

Figure 5:
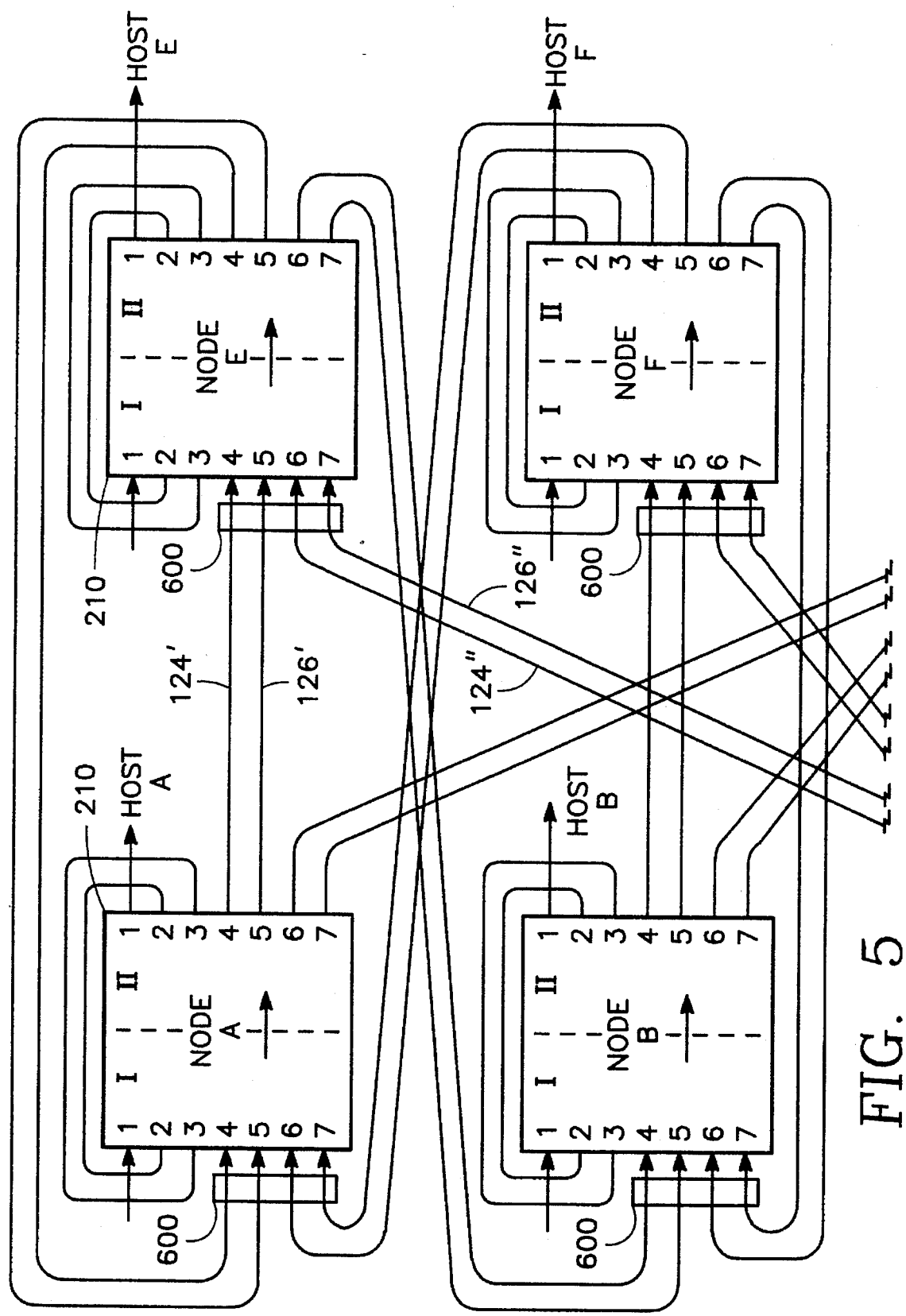
FIG. 5 is a simplified schematic diagram illustrating the connection of each input and output port of some of the 7-input permutation engine pairs constituting the nodes in the dual-ring embodiment of FIG. 2.

In order that packets deflected from their destination output ports NOT be deflected from their destination nodes, adjacent output ports (such as output ports 4 and 5) are connected in different layers to the same node, as shown in FIG. 5. It is this latter feature that provides the optimum network performance. Each packet is routed directly to its destination node, even if its destination output port is blocked, by routing it through an alternative layer or ring.

In alternative embodiments of the invention, any type of structure that closes in on itself, such as a hypercube or manhattan street network (MSN) is an acceptable topology for implementing the invention.

In the preferred embodiment, a cyclic SN minimizes the number of hops from source to destination while using a mesh topology within the switching nodes of the network to make routing decisions. The mesh topology provides certain interesting properties useful in realizing a strictly non-blocking crossbar needed to build a non-blocking multi-ring cyclic SN. This approach alleviates packet congestion associated with a single-ring SN by adding extra SN rings to balance the I/O to internal network capacities and reduce the deflection probability. Since the path length of a deflected packet in a cyclic SN increases by N for each deflection, where N is the number of columns of nodes, a premium is placed on avoiding congestion through network scalability.

Network Protocol

A variety of protocols are combined to achieve the desired system characteristics in the invention. These protocols include deflection (hot potato) routing for hardware simplicity, a WDM format to utilize the optical link bandwidth, and asynchronous packet traffic capability seen in asynchronous transfer mode (ATM) networks. Due to the unique nature of this protocol scheme, an interface is also required to convert from some industry standard format, such as the high performance parallel interface (HIPPI), to the desired format. By developing an interface to perform this function, a variety of data formats can be used by modifying the format specific hardware in the interface. In this manner, the network can be optimized for throughput, fault tolerance and other desired parameters without compromise due to the host data format.

Network Topology

Due to the need to route optical data, a recirculating topology is needed to act as a storage medium for the data while in the network. The proposed cyclic SN provides this mode of operation but is not the only such network that could be used.

Alternate Embodiments of the Invention

Any type of structure that closes in on itself, such as a hypercube or manhattan street network (MSN) are acceptable topologies for implementing alternative embodiments of the invention. The SN and MSN require 2×2 switching nodes for the communication fabric while the hypercube uses N×N nodes for an N dimensional hypercube. An extra pair of I/O ports are needed to connect a host to each switching node resulting in 3×3 nodes for the SN and MSN topologies and (N+1)×(N+1) nodes for an N-dimensional hypercube.

Topological Considerations

As mentioned above, the SN and mesh topologies each exhibit certain properties useful for the desired network. The ultimate goal of this design is to build a network with several hundred to several thousand I/O ports each capable of supporting up to 50 gigabits/sec per I/O link. In order to achieve this ambitious goal, the network architecture was developed with scalability being the most important design criteria. At the most fundamental level, this approach is seen in the node design which uses a permutation engine pair of the type described in co-pending U.S. patent application Ser. No. 08/111,318 filed herewith by the inventor herein entitled NON-BLOCKING CROSSBAR PERMUTATION ENGINE WITH CONSTANT ROUTING LATENCY now U.S. Pat. No. 5,377,182. As described in the co-pending application, a permutation engine pair allows for a scalable, packet asynchronous, strictly non-blocking crossbar with distributed control.

The scalability of the switching node structure, while not needed in a single-ring SN, provides the means for incorporating additional SN layers resulting in multi-ring SN topologies.

The invention is, in one embodiment, a multi-ring SN network to match the I/O bandwidth to the network capacity. This maintains the minimum hop property of the cyclic SN but alleviates congestion by routing deflected packets to alternate SN link layers. This superset network (supernet) using a SN topology, is a new class of network architecture which balances I/O capacity to internal network capacity by "stacking" multiple routing layers. Herein lies the need to have a strictly non-blocking crossbar for packet asynchronous traffic. The permutation engine is a constant routing latency distributed controller using a mesh topology to route packet asynchronous traffic in a strictly non-blocking manner. One strength of the mesh topology and distributed routing algorithm of this controller is that it is scalable in increments of one additional I/O connection. This property coupled with the strictly non-blocking capability provides an efficient mechanism for incrementally building the network capacity for a given I/O bandwidth per node.

For a single-ring SN, 3×3 switching nodes are needed to accommodate the two network ports and the host port. An m-ring SN requires (2m+1)×(2m+1) switching nodes for one host port and two more ports per SN ring. The packet delay through a j-input permutation engine pair is j clock cycles for a rearrangably non-blocking configuration and 2j for the strictly non-blocking version. If the strictly non-blocking variety is used, an additional delay of 4 clock cycles per node is incurred for each additional SN ring. This extra latency is additional pipeline delay but does not decrease the network capacity.

A recirculating queue can also be realized at a switching node by using a (2m+2)×(2m+2) switching node, where the extra I/O port is used to wrap data around which was not able to exit to the host port. Hence, packets which are blocked from the host port at the destination node can try again without recirculating through the SN. The emphasis of the design is to avoid packet deflections if possible at the expense of increasing the mean routing latency for the augmented multi-ring SN.

Basic Cyclic Shuffle Exchange Network

Figure 1:
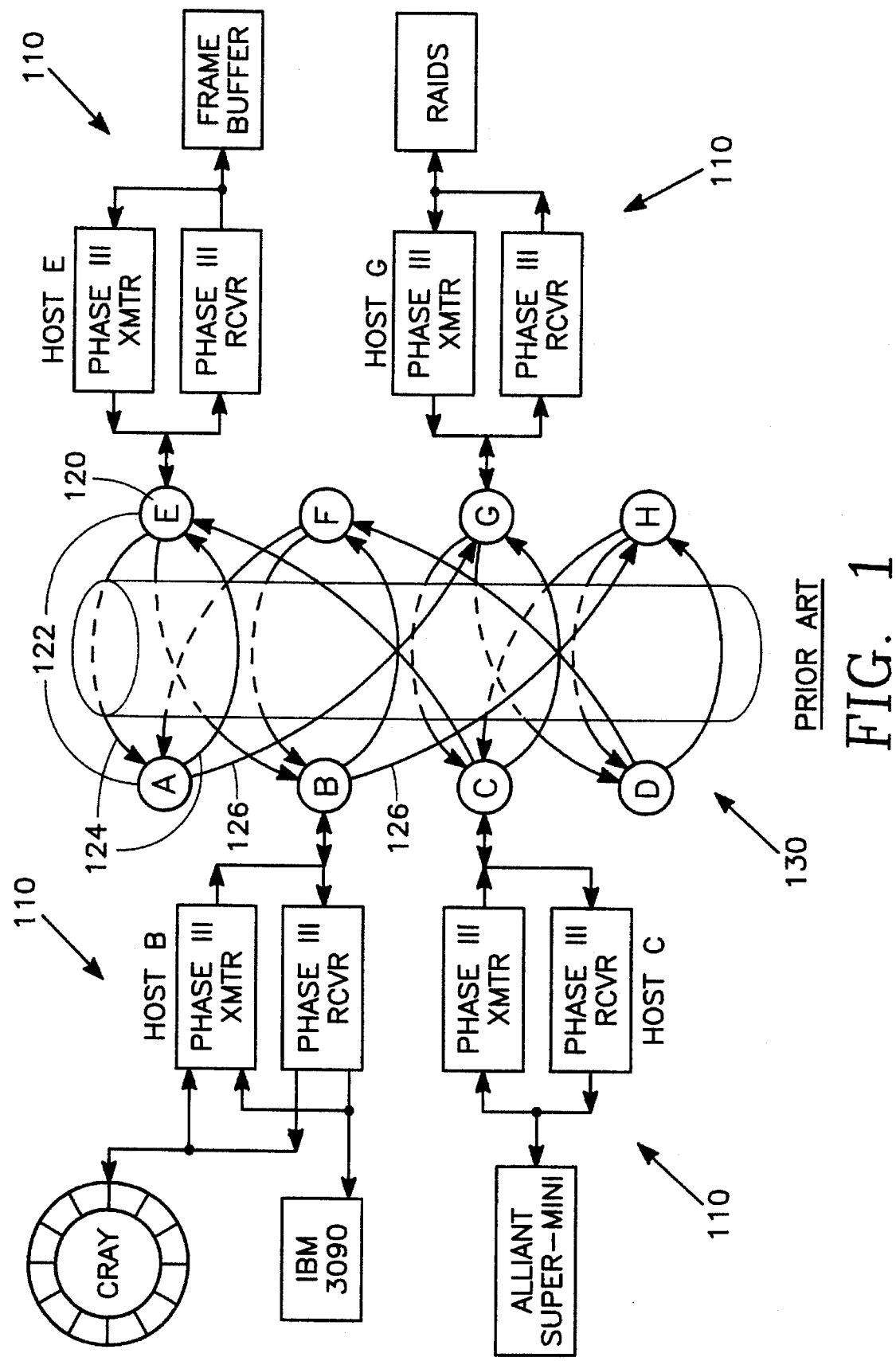
FIG. 1 is a simplified diagram of an eight-node cyclic shuffle exchange network of the prior art whose topology is employed in carrying out the preferred embodiment of the invention.

FIG. 1 illustrates the topology of a cyclic shuffle exchange network employed in carrying out the preferred embodiment of the invention. In the example of FIG. 1, the network has eight nodes (labelled A through H in the drawing). Four of the nodes, namely nodes B, C, E and G are connected to respective hosts 110 (labelled B, C, E and G like their supporting nodes). As suggested in the drawings, each host 110 can consist of a different computer system of any one of various well-known types.

The eight nodes are organized in two columns 120 of nodes, and in four pairs 122 of nodes of which each node in a pair 122 is in a respective column 120. Data links 130 lying on an imaginary cylindrical surface (constituting a single layer or "ring") connect the various nodes together. The nodes of each pair 122 are connected together by input and output uni-directional pair links 124 constituting a sub-set of the links 130. Each node pair 122 and the pair links 124 thereof are referred to herein as one "level" of the network of FIG. 1. Each node in one column 120 is connected via unidirectional input and output inter-level links 126 to nodes in the other column 120 in other levels. Thus, for example, node A in the top level of the left column 120 is connected by an output inter-level link 126 to node G in the third level down of the right column 120 and by an input inter-level link 126 from node F in the second level down of the right column 120. In similar manner, each node in a given column is connected via an output inter-level link to a node in a different level of the other column and via an input inter-level link from a node in a still different level of the other column.

Multiple-Ring Shuffle Exchange Network

The performance limitations of the cyclic shuffle exchange network have already been discussed herein. These limitations are overcome in one preferred embodiment of the invention illustrated in FIG. 2. In this embodiment, there are two rings 200, 205, each ring having all input and output links corresponding to the links 124, 126 of the eight-node shuffle exchange network of FIG. 1. The links 124', 126' of the inner ring 200 are indicated in dashed line while the links 124", 126" of the outer ring 205 are indicated in solid line in FIG. 2. Within each ring 200, 205, each node 210 in a given column is connected via an output inter-level link to a node in a different level of the other column and via an input inter-level link from a node in a still different level of the other column.

Figure 2:
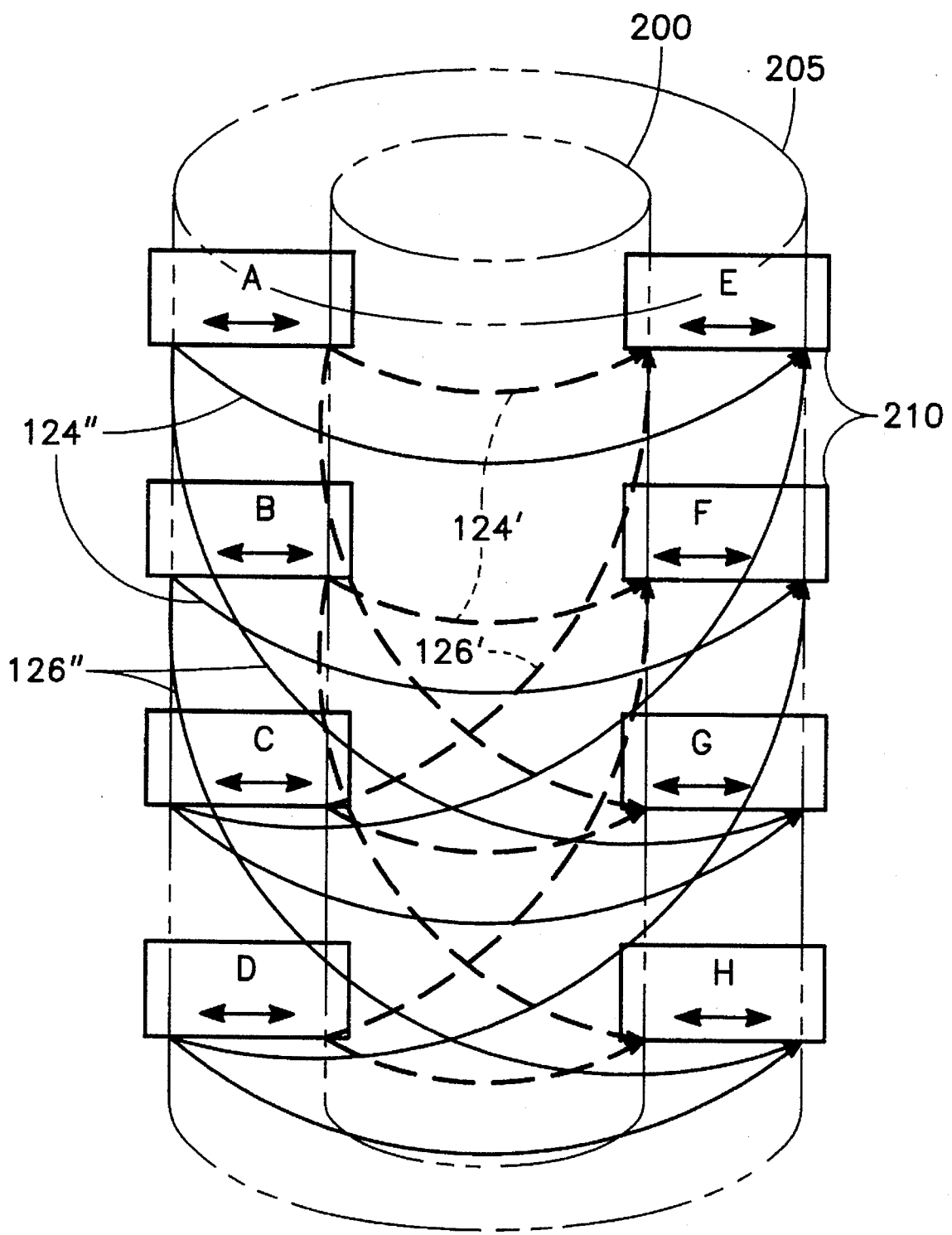
FIG. 2 is a simplified diagram of a dual-ring eight-node cyclic shuffle exchange network wherein each ring corresponds to the topology of FIG. 1, in accordance with a preferred embodiment of the invention.

Although there are two sets of links in FIG. 2, there is only one set of eight nodes 210. Each one of the eight nodes 210 of FIG. 2 is connected to the links of both rings 200, 205. Each node 210 is a non-blocking crossbar capable of connecting any input link connected thereto to any output link connected thereto, so that any input link from any one of the rings 200, 205 to a given node 210 can be connected by that node to an output link running to the other ring. This capability is indicated in the horizonal bidirectional arrows at each node 210 in FIG. 2. One example of such a non-blocking crossbar is the permutation engine pair disclosed in the above-referenced co-pending application.

Figure 3:
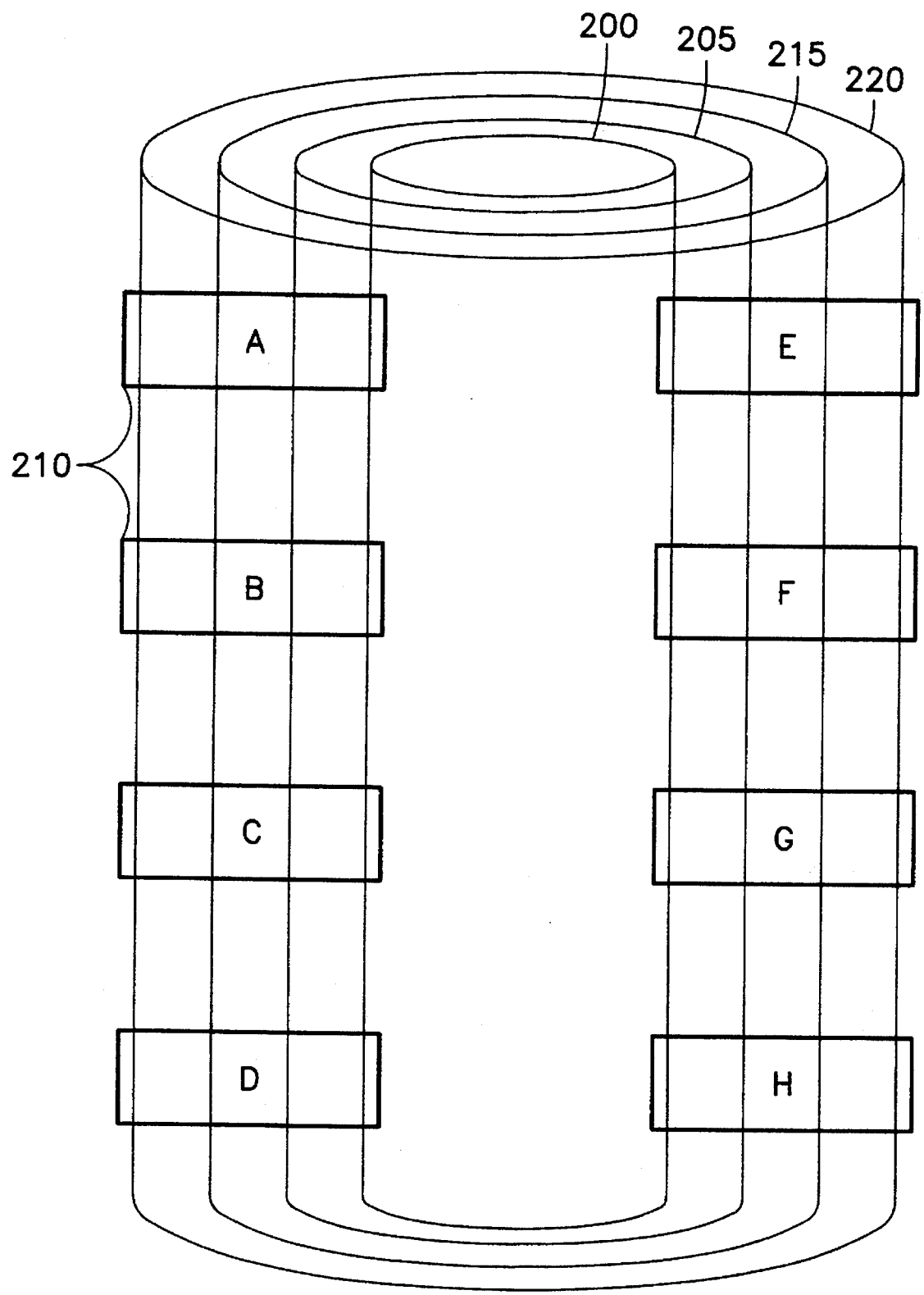
FIG. 3 is a simplified diagram of an eight-node four-ring cyclic shuffle exchange network in accordance with another preferred embodiment of the invention.

The concept of a dual-ring shuffle exchange network illustrated in FIG. 2 is extended to a four-ring shuffle exchange network illustrated in FIG. 3 having rings 200, 205, 215, 220 constituting cylindrical surfaces. As in the embodiment of FIG. 2, each ring 200, 205, 215 and 220 constitutes an independent link topology corresponding to the single shuffle exchange network of FIG. 1. Further, there are only eight nodes 210 (the number of nodes remaining the same as before), each node 210 being connected to the corresponding links of each of the four rings. The concept is further expandable to even greater numbers of rings.

The main advantage of the multi-ring network concept exemplified in FIGS. 2 and 3 is that each node 210 can switch a packet to an alternate route in another layer (ring) if the desired route in a given layer (ring) is not available due to heavy traffic. Therefore, the network is far less liable to congestion and has far greater capacity for the same number of nodes. How such alternative routing can be implemented is described now with reference to an embodiment employing a permutation engine pair for each network node 210.

Permutation Engine Pair Employed as a Node

As described in the above-referenced co-pending application, a cascaded permutation engine pair provides a non-blocking crossbar. Preferably, there are an equal number of input and output ports. In implementing a multi-layer network (such as a multi-ring shuffle net of the type illustrated in FIGS. 2 and 3), each node is a cascaded permutation engine pair. The number of permutation engine input ports and output ports must be sufficient to permit connection of the node to all layers of links. The minimum number of permutation engine input ports and output ports for the dual-ring shuffle exchange network of FIG. 2 would necessarily include four permutation input ports (two from each layer or ring) and four permutation engine output ports (two to each layer or ring). In addition, another permutation engine input and output is required to communicate with a host associated with the node. Preferably, the permutation engine pair has more than one input port and output port for each layer.

Connections Among Permutation Engine Pairs

Figure 4:
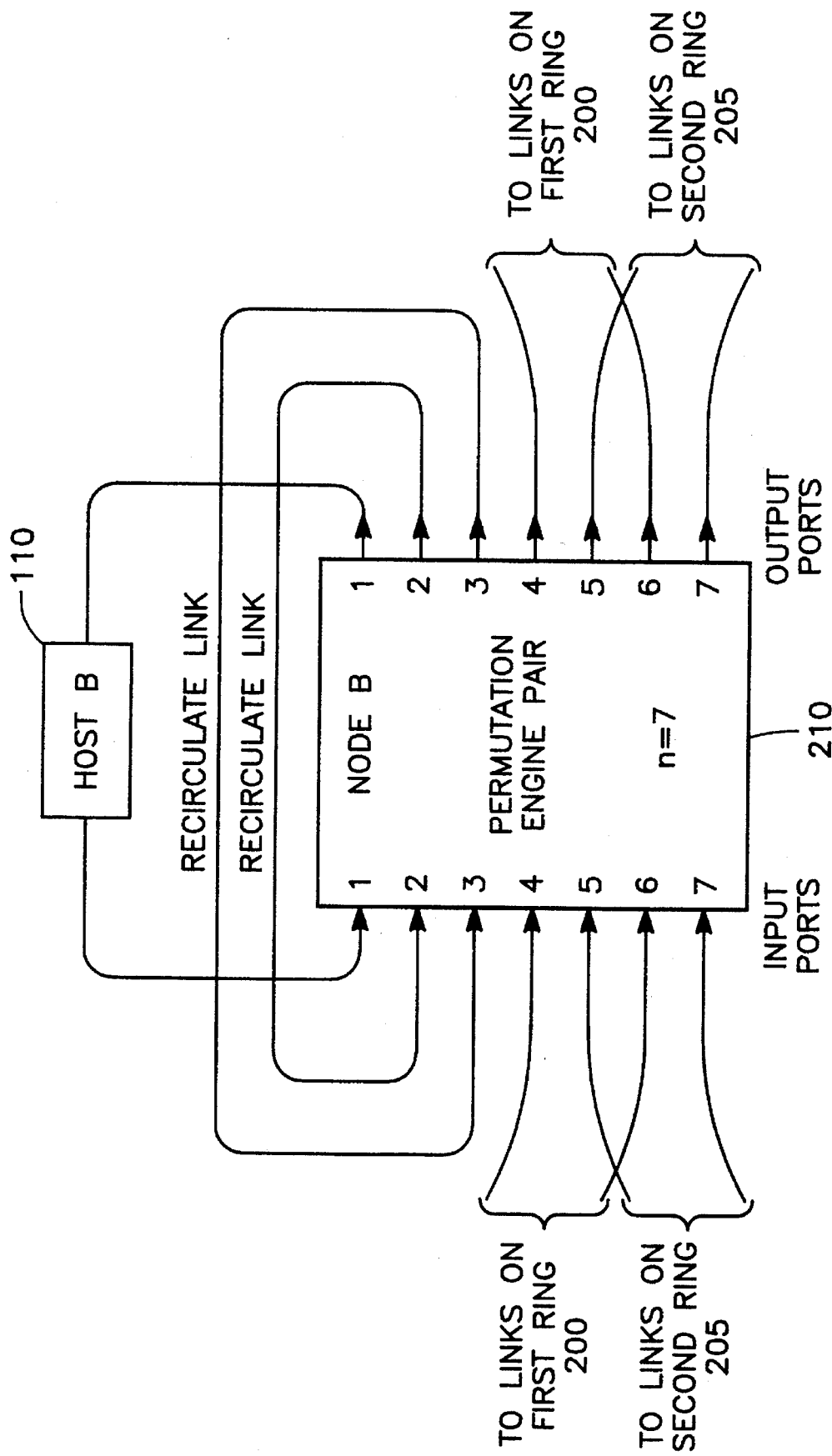
FIG. 4 is a block diagram of a 7-input permutation engine pair constituting a single node of the eight-node dual-ring shuffle exchange network of FIG. 2.

In the example of the 7-input permutation engine pair of FIG. 4, connection is to be made to two layers (or rings 200, 205 in the case of the dual-ring shuffle exchange network of FIG. 2). The input and output ports are labelled consecutively 1 through 7 in the drawings. Input port 1 and output port 1 provide the input and output connections to the nodes's host 110 in FIG. 1. Input ports 4 and 6 are connections in one layer of links from other nodes while input ports 5 and 7 are connections in another layer of links from other nodes. Output ports 4 and 6 are connections in the one layer (e.g., the outer ring 205) of links to other nodes while output ports 5 and 7 are connections in the other layer (e.g., the inner ring 200) of links to other nodes. Output ports 2 and 3 are recirculated back to input ports 2 and 3 respectively to provide a two-stage queue for as many as three simultaneous packets contending for access to the host through output port 1.

For example, if the permutation engine pair of FIG. 4 is node B of the dual-ring shuffle exchange network of FIGS. 2 and 5, then, as illustrated in FIG. 5, input ports 4 and 5 of FIG. 4 receive input links from node E, input ports 6 and 7 receive input links from node F, output ports 4 and 5 transmit on output links to node F and output ports 6 and 7 transmit on output links to node H. The links connected to input ports 4 and 6 and output ports 4 and 6 are on the outer ring 205, while the links connected to input ports 5 and 7 and output ports 5 and 7 are on the inner ring 200.

Figure 6:
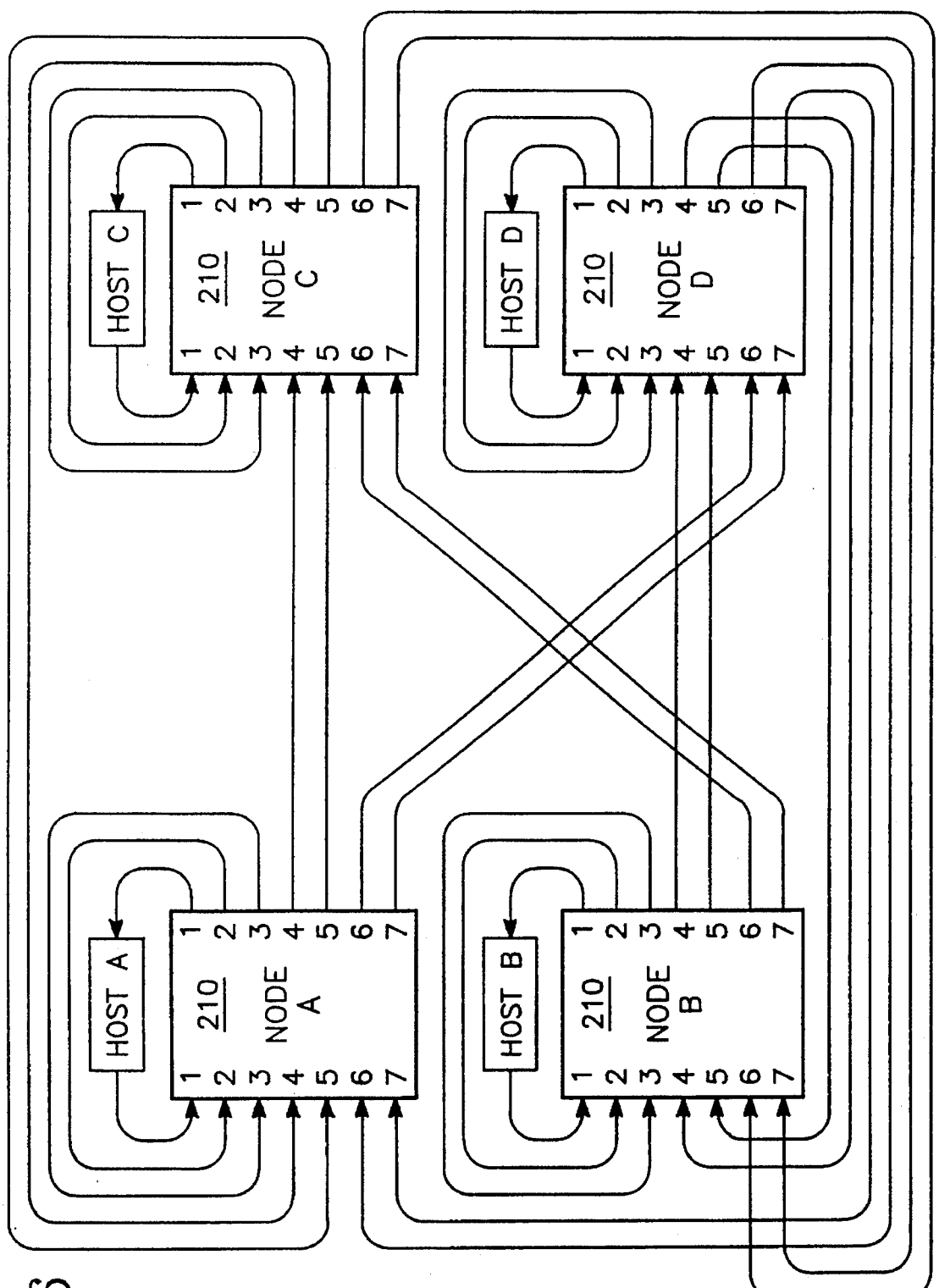
FIG. 6 is a simplified schematic diagram of a four-node quasi-shuffle exchange network employing four 7-input permutation engine pairs as the nodes.

The overall connection strategy of this embodiment is indicated in FIG. 5 while FIG. 6 illustrates a similar connection strategy for an embodiment having only four nodes. In yet another embodiment (not illustrated), there are only two nodes each constituting a permutation engine pair of the type illustrated in FIG. 4, the network having two layers of links. However, before discussing the connections between permutation engine pairs in the various embodiments, the operation of an individual permutation engine pair is first described.

Permutation Engine Topology

Figure 7:
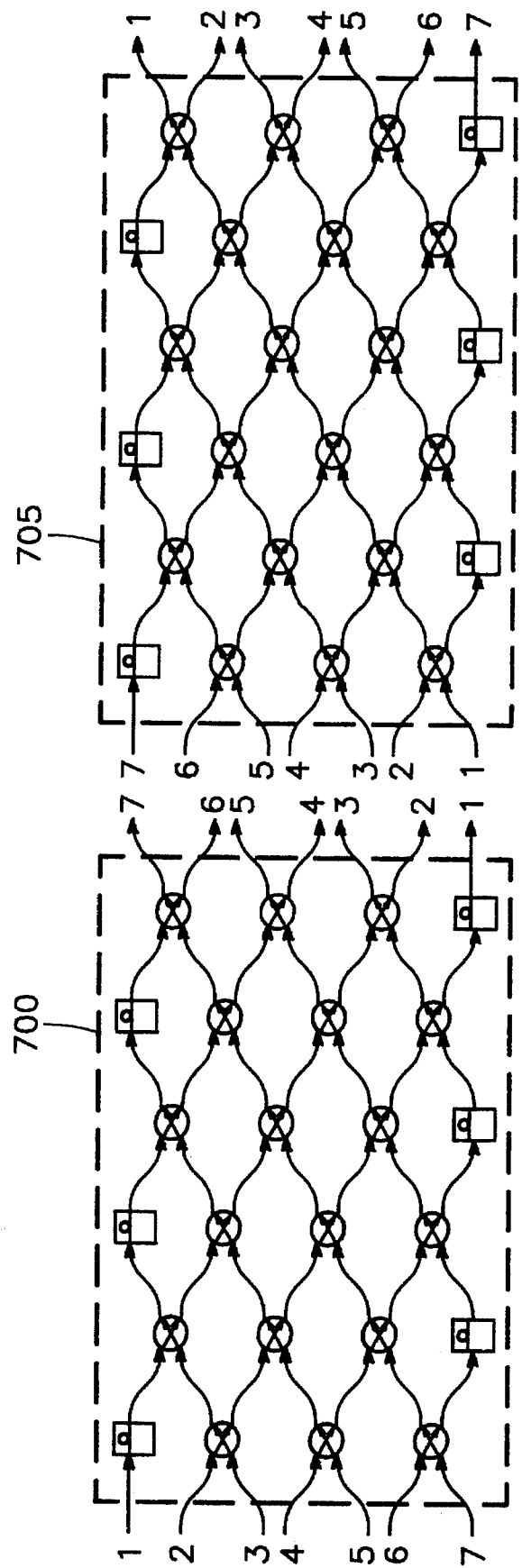
FIG. 7 is a schematic diagram of the 7-input permutation engine pair of FIG. 4.

FIG. 7 illustrates the basic internal connectivity between the 2-by-2 switches within a 7-input/7-output permutation engine pair. Each permutation engine 700, 705 of FIG. 7 corresponds to the 6-input/6-output permutation engine of the above-referenced co-pending application except that, instead of six columns of 2-by-2 switches there are seven, as well as a seventh row thereof.

Packet Deflection to Other Layers or Rings

The routing algorithm governing each 2-by-2 switch constitutes the same rules (i.e., Rules I, II and III) described in the above-referenced co-pending application. As described therein, contention by two packets for the same output port causes one of the contending packets to be routed to the adjacent port. Specifically, a packet deflected from output port 4 is routed to an adjacent output port such as output port 3 or 5 due to the operation of the routing algorithm. Likewise, a packet deflected from output port 6 is routed to an adjacent output port such as output port 5 or 7. The result is that deflected packets are routed on alternate routes in a layer different from that of the desired route or, in the case of output port 3, in one of the recirculation loops.

In order to optimize network performance and capacity, the various layers are preferably arranged so that any packet being routed within one node and destined for another desired node and which is deflected from its destination output port in the one node is routed in another layer to the same desired node for which it was originally destined. Thus, packets are routed directly to their destination nodes whether or not they have been deflected.

This may be seen by the examples given in the diagrams of FIGS. 8A and 8B. FIGS. 8A and 8B are diagrams illustrating two examples of how the 7-input permutation engine pair of FIG. 4 handles multiple packets contending for the same output ports. In FIG. 8A, six packets are present at the input ports, of which the packets at input ports 3 and 7 contend for output port 6. Both of these packets are indicated in the drawing by a numeral "6", corresponding to their desired destination output port. The diagram of FIG. 8A illustrates how each packet is routed through the first permutation engine 700 on the left and then through the second permutation engine 705 on the right of the drawing, following the routing algorithm described in the above-referenced co-pending application. Each packet is distinguished in the drawing by its destination output port number. As shown in FIG. 8A, only one of the contending packets reaches output port 6, the other one being deflected to output port 7. Thus, the deflected packet is deflected from the second layer or plane (corresponding to output ports 4 and 6) to the first layer (corresponding to output ports 5 and 7). Eventually, after one or more such detours, the deflected packet ultimately reaches its desired destination.

Turning to the preferred embodiments of FIGS. 2 and 3, this means that packets deflected from output ports of one of the rings will be deflected to another ring. This feature is realized by assigning adjacent ports (input and output) to different rings or layers. Thus, in the preferred embodiment, no two adjacent ports are assigned to the same layer or ring. For example, input and output ports 4 and 6 are connected to links in the second ring 205 while input and output ports 5 and 7 are connected to links in the inner ring 200.

Optimum Deflection Routing

In order that packets deflected from their destination output ports NOT be deflected from their destination nodes, adjacent output ports (such as output ports 4 and 5) are connected in different layers to the same node, as shown in FIG. 5. It is this latter feature that provides the optimum network performance. Each packet is routed directly to its destination node, even if its destination output port is blocked, by routing it through an alternative layer or ring.

However, it should be noted that a working network can be constructed without this latter feature, albeit with inferior performance and lower capacity.

Recirculation of Packets Contending for the Host

The advantage of the recirculation of output ports 2 and 3 back to input ports 2 and 3 is best illustrated in FIG. 8A. As already described, output port 1 is the host port. It may very often happen that many packets will contend for access to the host (i.e., output port 1). Due to the routing algorithm described in the above-referenced co-pending application, at least one such contending packet will be deflected to output port 2. The recirculation of output ports 2 and 3 back to input ports 2 and 3 provides a queue for such contending packets.

For example, in FIG. 8A, a packet having output port 1 as its destination is received at input port 4 shortly before a second packet also having output port 1 as its destination is received at input port 6 (as denoted by the numbering in parentheses to the left, i.e., "(1)" and "(2)" in FIG. 8A). The first-to-arrive of these two contending packets ultimately reaches output port 1 of the second permutation engine 705, while the second-to-arrive contending packet is deflected to output port 2. From FIG. 4, it is seen that this deflected packet is routed back to input port 2 for a second chance at being routed to its destination port. Eventually, it reaches output port 1. For example, when this deflected packet arrives at input port 2, the situation at that point may be that illustrated in FIG. 8B. In this case, the deflected packet has arrived at the input to the first permutation engine 700 before two other packets at input ports 4 and 6 also destined for output port 1. As can be seen from FIG. 8B, the previously deflected packet is finally routed to output port 1 while the two other contending packets are routed to respective ones of the recirculation output ports 2 and 3.

The recirculation ports (input ports 2 and 3 and output ports 2 and 3) enable a packet to be deflected from the host port (output port 1) without leaving the node, a significant advantage.

This same advantage is realized for packets deflected from output port 4 to output port 3. An example of such a deflection is illustrated in FIG. 8A. Specifically, packets at input ports 2 and 5 contend for output port 4. The packet at input port 2 reaches its desired destination (output port 4) while the packet at input port 5 is deflected to output port 3 of the second permutation engine 705 which recirculates back to input port 3 of the first permutation engine 700.

Permutation Engine Pair for the Four-Ring Network

Figure 9:
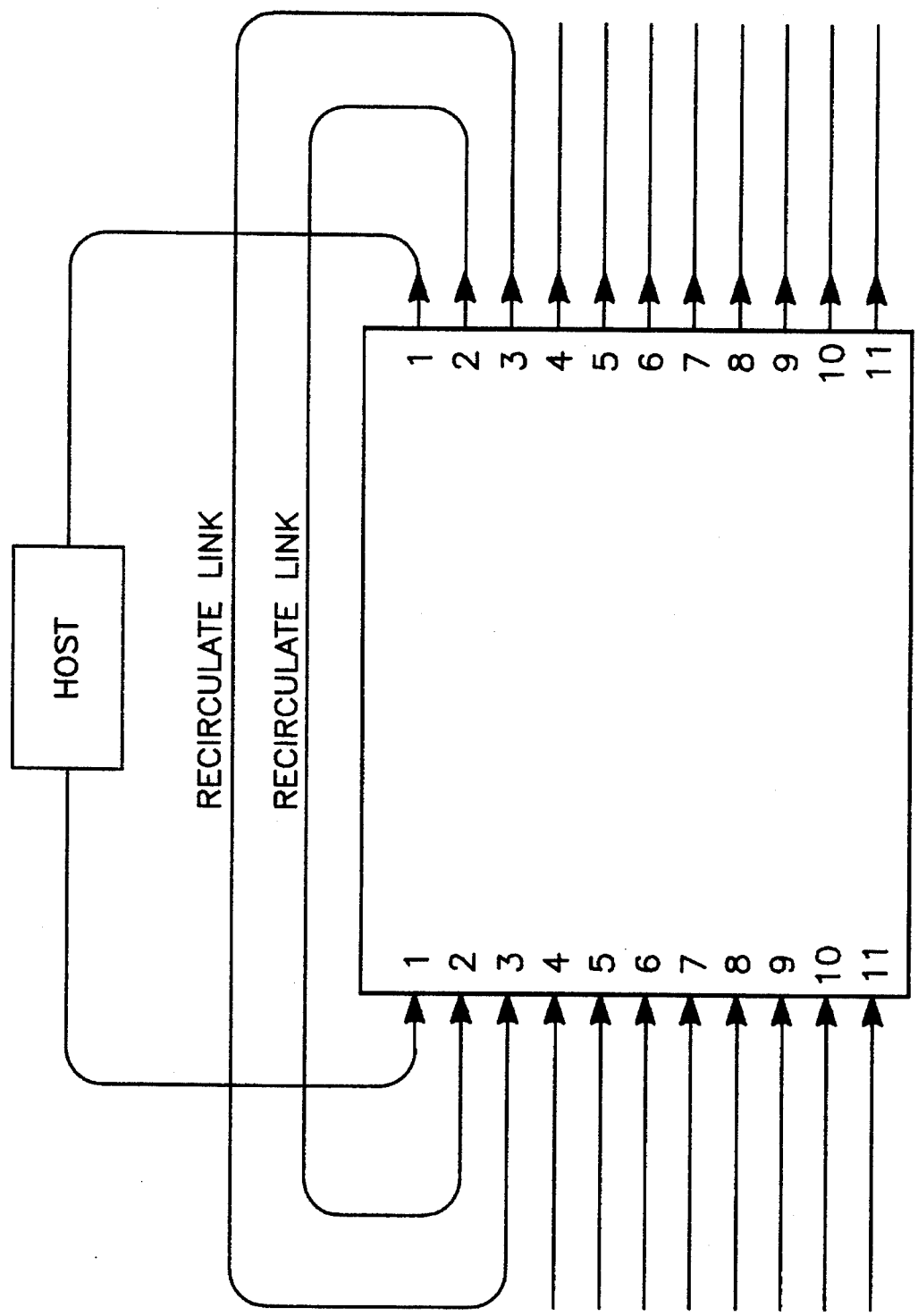
FIG. 9 is a block diagram of an 11-input permutation engine pair employed as a single node in an implementation of the four-ring eight-node cyclic shuffle exchange network of FIG. 3.

The 7-input permutation engine topology described above implements a two-layer network or the two-ring shuffle exchange network of FIG. 2. In order to implement a four-layer network or the four-ring shuffle exchange network of FIG. 4, a larger permutation engine topology is required. In order to provide the two-link recirculation feature of FIG. 4 and input and output links to a host as well as the four rings of FIG. 3, an 11-input/11-output port permutation engine pair illustrated in FIG. 9 is required. As in FIG. 4, in FIG. 9 input and output ports 1 are connected to the host. Input and output ports 2 and 3 are the recirculation ports. Input and output ports 4 and 8 lie in the first ring 200. Input and output ports 5 and 9 lie in the second ring 205. Input and output ports 6 and 10 lie in the third ring 215. Input and output ports 7 and 11 lie in the last ring 220. Input ports 4 through 7 are connected to a first node while input ports 8 through 11 are connected to a second node. Output ports 4 through 7 are connected to a third node while output ports 8 through 11 are connected to a fourth node.

Adding Further Layers

While the invention has been described with reference to embodiments of networks having two and four layers (specifically, the shuffle exchange network of FIG. 2 having two rings and the shuffle exchange network of FIG. 3 having four rings), the invention is certainly not limited to only two or four rings. Increasing the number of layers or rings merely requires a corresponding increase in the dimensionality of the crossbar, namely the number of input/output ports on the permutation engine pair.

Node-to-Node Packet Routing

Herein it is assumed that upon receipt at a given node, each packet has a header identifying a particular node as having its destination host. In the above-referenced co-pending application, it was suggested that an address translation look-up table be employed to automatically assign each packet received at any input port a destination output port number best calculated to ultimately route the packet to its destination node. Such a look-up table is readily constructed directly from the topology of the network. For example, a packet received at node B of FIG. 2 and having as its destination the host of node E is best routed within node B to output port 4, from whence it is routed to nodes F and then A and from thence to node E via output port 4 of node F and output port 4 of node A.

Each look-up table is further programmed so that any packet received designating the immediate node as its destination is assigned output port 1 as its destination output port.

As described in the above-referenced co-pending application, packet routing within a permutation engine is controlled in a header plane thereof while the packets actually travel through an underlying data plane of the permutation engine. Thus, the destination output port number furnished by the address translation look-up table is input to the header plane, permitting the packet header identification of its destination node to remain unchanged and therefore available to the next node or permutation engine pair that the packet encounters.

FIG. 5 shows that an address translation look-up table 600 is present at the input of each node or permutation engine pair.

Simulations

Both single and multi-ring SN's were simulated to verify the operation of the permutation engine concept, validate the cyclic SN model and assess the theoretical limitations of the multi-ring design approach.

A model for the permutation engine-pair switching node was developed and installed into a system level model of a cyclic SN. Due to the geographic extent of a WAN, it was necessary to realize a packet asynchronous switch as there is presently no good way to synchronize optical data at packet boundaries. The packet asynchronous nature of the switch is achieved through the distributed control structure with strictly non-blocking capability, allowing for any possible input to output connection not already in use.

Figure 10C:
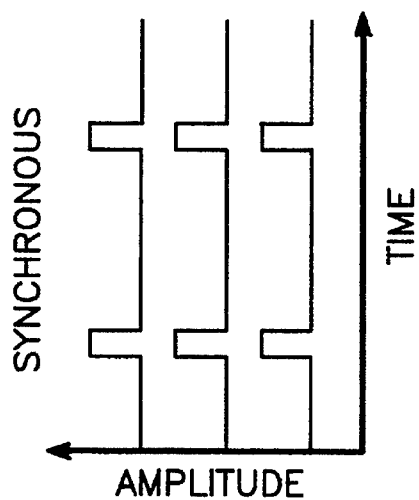
FIGS. 10A, 10B and 10C are time-domain waveforms illustrating the three types of packet sequencing tested in simulations of the invention, including synchronous, skewed-synchronous and asynchronous packet sequences.
Figure 10B:
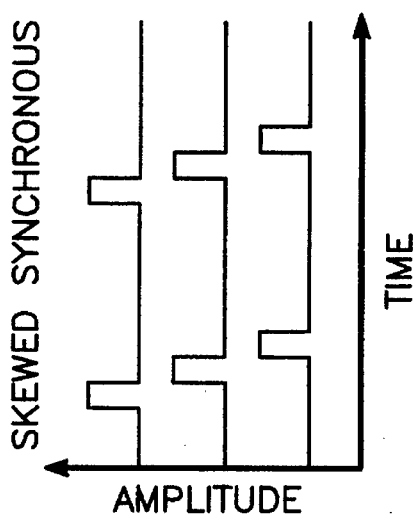
Figure 10A:
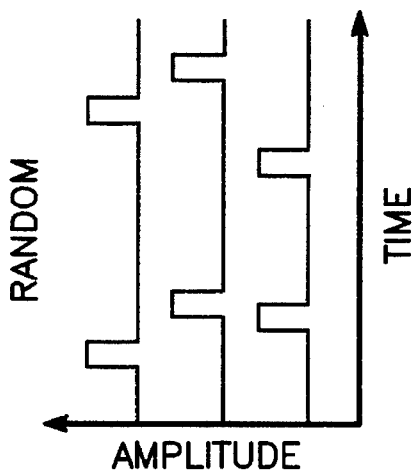

A cyclic SN was simulated using the SES/Workbench discrete event simulator. The current level of sophistication of the model allows for a multi-ring SN using the permutation engine for routing control of the switching nodes. A uniform distribution is used to select source and destination nodes. Source nodes are selected from available input links, while destination nodes are selected without regard to existing traffic patterns. The three types of traffic patterns used—synchronous, skewed synchronous and asynchronous—are shown in FIGS. 10A, 10B and 10C, respectively. For synchronous traffic, packets are injected into all switching nodes at the same time slot with a suitable number of time slots allotted between such injections to achieve the desired network loading. For skewed synchronous traffic, single packets are injected into the SN at regular intervals. Asynchronous traffic is similar to skewed synchronous with an exponential dither about the mean injection points to simulate operation for packet asynchronous traffic. Packets are not tagged with priority/age information for two reasons: i) header modification is difficult to do at gigabit/sec rates with optical signals; and ii) priority/age information is only useful for packet synchronous traffic.

The simulation results show that the multi-ring network can handle all three types of traffic. For a single-ring SN, the maximum routing latency can be very large compared to the mean latency even at low network capacity. This result is due to the high deflection probability of the single layer SN. A multi-ring SN, on the other hand, can run at 100% I/O capacity with minimal routing latency due to load balancing afforded by adding extra rings with dynamic interaction between all rings. This fully interconnected multi-ring configuration demonstrates the essential advantage of the concept of the invention.

While the invention has been described in detail by specific reference to preferred embodiments thereof, it is understood that variations and modifications thereof may be made without departing from the true spirit and scope of the invention.

What is claimed is:

1. A communication network for routing packets therethrough, each packet having a packet header designating a destination within said network, said network comprising:

plural crossbar nodes each having plural input and output ports;

at least first and second layers of connecting links connected to all of said crossbar nodes at first and second input ports, respectively, and first and second output ports, respectively, thereof;

each one of said plural crossbar nodes comprising local routing means responsive to said packet headers for deflecting at least one of a plurality of packets contending for a particular output port connected to one of said first and second layers to an output port connected to the other of said first and second layers compatible with the destination designated by the one packet's header.

2. The network of claim 1 further comprising:

a plurality of local hosts, each of said plurality of local hosts being connected to an input port and an output port of a respective one of said plural crossbar nodes; and respective local recirculation links each connecting together an input and output port of a respective node, wherein said local routing means comprises means responsive to said packet headers for routing one of plural packets whose destinations are the same local host to a local recirculation link of the same node.

3. The communication network of claim 1 further comprising plural hosts connected to respective ones of said crossbar nodes.

4. The communication network of claim 3 further comprising local recirculation means for recirculating a given packet from a predetermined output port directly to a predetermined input port of a respective one of said crossbar nodes connected to a host whenever said given packet has been blocked from access to said host.

5. The communication network of claim 1 wherein said local routing means route a packet destined for travel in one of said layers to the other layer whenever access of said packet to said one layer is blocked.

6. The communication network of claim 5 wherein said destination corresponds to a particular node, and said local routing means routes said packet on a particular link of one of said first and second layers to said particular node in response to said header.

7. The communication network of claim 2 wherein said local routing means routes a packet in said node destined for one of said output ports to the adjacent output port whenever the one output port is blocked.

8. The network of claim 7 wherein said local recirculation links are connected to input and output ports adjacent the input and output ports connected to said host.

9. The communication network of claim 1 wherein said local routing means comprise an address translation table which specifies for each destination an output port corresponding to an optimum route to the destination.

10. The communication network of claim 1 wherein each of said crossbar nodes is a non-blocking crossbar switch.

11. The communication network of claim 10 wherein each of said crossbar nodes has N input ports and comprises a pair of permutation engines in cascade.

12. The communication network of claim 11 wherein each of said permutation engines comprises:

a plurality of individual links which carry individual packets, each link having a link input end and a link output end;

a plurality of switches, each of said switches comprising a top switch input and a bottom switch input connected to a corresponding pair of said link output ends and a top switch output and a bottom switch output connected to a corresponding pair of link input ends, whereby each switch is connected to four different links, each of said switches having an exchange state which routes packets from said top switch input and bottom switch input to said bottom switch output and top switch output, respectively, and a bypass state which routes packets from said top switch input and bottom switch input to said top switch output and bottom switch output, respectively;

a plurality of individual controller means governing respective ones of said switches for sensing from a header of a packet at each switch input the identity of the destination output port of the packet and selecting one of said exchange and bypass states in accordance with the identity of said destination output port and in accordance with the location of the corresponding switch relative to said destination output port.

13. The communication network of claim 12 wherein each of said crossbar nodes further comprises N input ports, and wherein said network comprises a host at one of said crossbar nodes, and wherein:

one of said input ports and one of said output ports of said one node are connected to said host; and at least one pair, each, of said input ports and of said output ports is connected to another one of said crossbar nodes, each port in each pair being connected to links in different ones of said layers.

14. A communication network for routing packets therethrough, each packet having packet header designating a destination within said network, said network comprising:

plural crossbar nodes each having plural input and output ports;

plural redundant sets of links connecting output ports of each node to input ports of others of said nodes whereby all of said nodes are connected by said links;

a local independent controller at each node responsive to the packet headers of packets received at a particular node for deflecting at least one, but not all, of a plurality of packets contending for a particular output port as designated by the respective packet headers to another output port having the same node-to-node connection as said particular output port.

15. The network of claim 14 further comprising:

a plurality of local hosts, each of said plurality of local hosts being connected to an input port and an output port of a respective one of said plural crossbar nodes; and respective local recirculation links each connecting together at least an input and output port of a respective node, wherein said controller routes at least one of plural packets whose headers designate the same local host to a local recirculation link of the same node.

16. The communication network of claim 14 further comprising plural hosts connected to respective ones of said crossbar nodes.

17. The communication network of claim 16 wherein said controller comprises local recirculation means for recirculating a given packet from a predetermined output port directly to a predetermined input port of a respective one of said crossbar nodes connected to a host whenever said given packet has been blocked from access to the corresponding host.

18. The communication network of claim 14 wherein said controller routes said at least one of said packets destined for said particular output port to said another output port whenever access of said at least one of said optical packets to said particular output port is blocked.

19. The communication network of claim 18 wherein said destination corresponds to a different node, and said controller routes said at least one of said packets on a particular link of one of said plural redundant sets of links to said different node in response to said header.

20. The communication network of claim 15 wherein said controller routes said at least one of said optical packets destined for said particular output port to said another output port whenever the particular output port is blocked.

21. The communication network of claim 15 wherein said controller routes said at least one of said plural packets destined for said same local host to said local recirculation link of the same node whenever access to said same local host is blocked.

22. The communication network of claim 14 wherein said controller comprises an address translation table which specifies for each destination an output port corresponding to an optimum route to the destination.

23. The communication network of claim 14 wherein each of said crossbar nodes is a non-blocking crossbar switch.

24. The communication network of claim 23 wherein each of said crossbar nodes has N input ports and comprises a pair of permutation engines in cascade.

25. The communication network of claim 24 wherein each of said permutation engines comprises:

a plurality of individual links which carry individual packets, each link having a link input end and a link output end;

a plurality of switches, each of said switches comprising a top switch input and a bottom switch input connected to a corresponding pair of said link output ends and a top switch output and a bottom switch output connected to a corresponding pair of link input ends, whereby each switch is connected to four different links, each of said switches having an exchange state which routes packets from said top switch input and bottom switch input to said bottom switch output and top switch output, respectively, and a bypass state which routes packets from said top switch input and bottom switch input to said top switch output and bottom switch output, respectively;

a plurality of individual controller means governing respective ones of said switches for sensing from a header of a packet at each switch input the identity of the destination output port of the packet and selecting one of said exchange and bypass states in accordance with the identity of said destination output port and in accordance with the location of the corresponding switch relative to said destination output port.

26. The communication network of claim 25 wherein each of said crossbar nodes further comprises N input ports, and wherein said network comprises a host at one of said crossbar nodes, and wherein:

one of said input ports and one of said output ports of said one node are connected to said host; and at least one pair, each, of said input ports and of said output ports is connected to another one of said crossbar nodes, each port in each pair being connected to links in different ones of said layers.

27. The communication network of claim 1 wherein said local routing means routes said at least one of said plurality of packets without reference to priority levels of said plurality of packets.

28. The communication network of claim 1 wherein said local routing means routes said at least one of said plurality of packets without reference to delivery times at each one of said plural crossbar nodes of said plurality of packets.

29. A communication network for routing optical packets in optical form therethrough, each packet having an optical packet header designating a destination within said network, said network comprising:

plural crossbar nodes each having plural input and output ports;

at least first and second layers of optically connecting links connected to said crossbar nodes at first and second input ports, respectively, and first and second output ports, respectively, thereof;

each one of said plural crossbar nodes comprising local optical routing means responsive to said optical packet headers for deflecting at least one of a plurality of optical packets contending for a particular output port connected to one of said first and second layers to an output port connected to the other of said first and second layers and compatible with the destination designated by the header of said one optical packet, while maintaining said optical form of said one packet.

30. The network of claim 29 further comprising:

a plurality of local hosts, each of said plurality of local hosts being connected to an input port and an output port of a respective one of said plural crossbar nodes; and respective local optical recirculation links each connecting together an input and output port of a respective node, wherein said local optical routing means comprises means responsive to said optical packet headers for routing one of plural optical packets whose destinations are the same local host to a local optical recirculation link of the same node.

31. The communication network of claim 29 further comprising plural hosts connected to respective ones of said crossbar nodes.

32. The communication network of claim 31 further comprising local optical recirculation means for recirculating a given optical packet from a predetermined output port directly to a predetermined input port of a respective one of said crossbar nodes connected to a host whenever said given optical packet has been blocked from access to said host.

33. The communication network of claim 29 wherein said local optical routing means routes an optical packet destined for travel in one of said layers to the other layer whenever access of said optical packet to said one layer is blocked.

34. The communication network of claim 33 wherein said destination corresponds to a particular node, and said local routing means routes said optical packet on a particular link of one of said first and second layers to said particular node in response to said header.

35. The communication network of claim 30 wherein said local optical routing means routes an optical packet in said node destined for one of said output ports to the adjacent output port whenever the one output port is blocked.

36. The network of claim 35 wherein said local optical recirculation links are connected to input and output ports adjacent the input and output ports connected to said host.

37. The communication network of claim 29 wherein said local optical routing means comprise an address translation table which specifies for each destination an output port corresponding to an optimum route to the destination.

38. The communication network of claim 29 wherein each of said crossbar nodes is a non-blocking crossbar switch.

39. The communication network of claim 38 wherein each of said crossbar nodes has N input ports and comprises a pair of permutation engines in cascade.

40. The communication network of claim 39 wherein each of said permutation engines comprises:
a plurality of individual links which carry individual optical packets, each link having a link input end and a link output end;
a plurality of optical switches, each of said switches comprising a top switch input and a bottom switch input connected to a corresponding pair of said link output ends and a top switch output and a bottom switch output connected to a corresponding pair of link input ends, whereby each switch is connected to four different links, each of said switches having an exchange state which routes optical packets from said top switch input and bottom switch input to said bottom switch output and top switch output, respectively, and a bypass state which routes optical packets from said top switch input and bottom switch input to said top switch output and bottom switch output, respectively;
a plurality of individual controller means governing respective ones of said optical switches for sensing from a header of an optical packet at each switch input the identity of the destination output port of the optical packet and selecting one of said exchange and bypass states in accordance with the identity of said destination output port and in accordance with the location of the corresponding switch relative to said destination output port.

41. The communication network of claim 40 wherein each of said crossbar nodes further comprises N input ports, and wherein said network comprises a host at one of said crossbar nodes, and wherein:
one of said input ports and one of said output ports of said one node are optically connected to said host; and
at least one pair, each, of said input ports and of said output ports is connected to another one of said crossbar nodes, each port in each pair being optically connected to links in different ones of said layers.

42. The communication network of claim 29 wherein said local optical routing means routes said at least one of said plurality of optical packets without reference to priority levels of said plurality of optical packets.

43. The communication network of claim 29 wherein said local optical routing means routes said at least one of said plurality of optical packets without reference to delivery times at each one of said plural crossbar nodes of said plurality of packets.

44. A communication network for routing optical packets in optical form therethrough, said network comprising:
plural crossbar nodes each having plural input and output ports;
a plurality of respective optical links connecting respective ones of said input ports and output ports of said nodes;
each one of said plural crossbar nodes comprising local optical routing means for deflecting at least one of plural optical packets asynchronously contending for a particular output port while continuously maintaining the optical form of said one optical packet.

45. The communication network of claim 44 wherein said local optical routing means deflects said one packet to an output port of the one node other than said particular output port.

46. The communication network of claim 44 wherein at least some respective ones of said optical links connect from output ports of respective ones of said nodes to input ports of other respective ones of said nodes.

47. The communication network of claim 46 wherein said input and output ports of said nodes comprise plural layers of input and output ports, connections made by said optical links being confined within respective layers of said input and output ports, and wherein said routing means diverts said one packet to an output port of a layer different from the layer of said particular port.

48. A communication network for routing optical packets in optical form therethrough, said network comprising:
plural crossbar nodes each having plural input and output ports;
a plurality of respective optical links connecting respective ones of said input ports and output ports of said nodes;
each one of said plural crossbar nodes comprising local optical routing means for deflecting at least one of plural optical packets contending for a particular output port independently of arrival times of said packets at said one node while continuously maintaining the optical form of said one optical packet.

49. The communication network of claim 48 wherein said local optical routing means deflects said one packet to an output port of the one node other than said particular output port.

50. The communication network of claim 48 wherein at least some respective ones of said optical links connect from output ports of respective ones of said nodes to input ports of other respective ones of said nodes.

51. The communication network of claim 50 wherein said input and output ports of said nodes comprise plural layers of input and output ports, connections made by said optical links being confined within respective layers of said input and output ports, and wherein said routing means diverts said one packet to an output port of a layer different from the layer of said particular port.

52. A communication network for routing optical packets therethrough, each optical packet having an optical packet header designating a destination within said network, said network comprising:

plural crossbar nodes each having plural input and output ports;

plural redundant sets of optically-connected links connecting output ports of each node to input ports of others of said nodes whereby all of said nodes are connected by said optically-connected links;

a local independent controller at each node responsive to the optical packet headers of optical packets received at a particular node for deflecting at least one, but not all, of a plurality of optical packets contending for a particular output port as designated by the respective packet to another output port having the same node-to-node connection as said particular output port.

53. The network of claim 52 further comprising:

a plurality of local hosts, each of said plurality of local hosts being connected to an input port and an output port of a respective one of said plural crossbar nodes; and respective local optical recirculation links each connecting together at least an input and output port of a respective node, wherein said controller routes at least one of plural optical packets whose optical headers designate the same local host to a local optical recirculation link of the same node.

54. The communication network of claim 53 wherein said controller comprises local optical recirculation means for recirculating a given optical packet from a predetermined output port directly to a predetermined input port of a respective one of said crossbar nodes connected to a host whenever said given optical packet has been blocked from access to the corresponding host.

55. The communication network of claim 52 wherein said controller routes said at least one of said optical packets destined for said particular output port to said another output port whenever access of said at least one of said optical packets to said particular output port is blocked.

56. The communication network of claim 55 wherein said destination corresponds to a different node, and said controller routes said at least one of said optical packets on a particular link of one of said plural redundant sets of optically-connected links to said different node in response to said header.

57. The communication network of claim 53 wherein said controller routes said at least one of said optical packets destined for said particular output port to said another output port whenever the particular output port is blocked.

58. The communication network of claim 53 wherein said controller routes said at least one of said plural optical packets destined for said same local host to said local optical recirculation link of the same node whenever access to said same local host is blocked.

59. The communication network of claim 58 wherein each of said crossbar nodes comprises a pair of permutation engines in cascade, wherein each of said permutation engines comprises:

a plurality of individual links which carry individual optical packets, each link having a link input end and a link output end;

a plurality of optical switches, each of said switches comprising a top switch input and a bottom switch input connected to a corresponding pair of said link output ends and a top switch output and a bottom switch output connected to a corresponding pair of link input ends, whereby each switch is connected to four different links, each of said switches having an exchange state which routes optical packets from said top switch input and bottom switch input to said bottom switch output and top switch output, respectively, and a bypass state which routes optical packets from said top switch input and bottom switch input to said top switch output and bottom switch output, respectively;

a plurality of individual controller means governing respective ones of said optical switches for sensing from an optical header of an optical packet at each switch input the identity of the destination output port of the optical packet and selecting one of said exchange and bypass states in accordance with the identity of said destination output port and in accordance with the location of the corresponding switch relative to said destination output port.

60. The communication network of claim 59 wherein each of said crossbar nodes further comprises N input ports, and wherein said network comprises a host at one of said crossbar nodes, and wherein:

one of said input ports and one of said output ports of said one node are optically connected to said host; and at least one pair, each, of said input ports and of said output ports is connected to another one of said crossbar nodes, each port in each pair being optically connected to links in different ones of said layers.

61. The communication network of claim 52 wherein said local optical routing means routes said at least one of said plurality of optical packets without reference to priority levels of said plurality of optical packets.

62. The communication network of claim 52 wherein said local optical routing means routes said at least one of said plurality of optical packets without reference to delivery times at each one of said plural crossbar nodes of said plurality of packets.

* * * * *